US010984799B2

(12) United States Patent
Pasko et al.

(10) Patent No.: US 10,984,799 B2
(45) Date of Patent: Apr. 20, 2021

(54) HYBRID SPEECH INTERFACE DEVICE

(71) Applicant: Amazon Technologies, Inc., Seattle, WA (US)

(72) Inventors: Stanislaw Ignacy Pasko, Gdansk (PL); Michal Papierski, Aleksandrów (PL); Maciej Makowski, Aurora (CA); Marcin Fuszara, Gdansk (PL)

(*) Notice: Subject to any disclaimer, the term of this patent is extended or adjusted under 35 U.S.C. 154(b) by 0 days.

(21) Appl. No.: 15/934,726

(22) Filed: Mar. 23, 2018

(65) Prior Publication Data
US 2019/0295552 A1    Sep. 26, 2019

(51) Int. Cl.
| G10L 15/34 | (2013.01) |
| G06F 3/16 | (2006.01) |
| G10L 15/30 | (2013.01) |
| G10L 15/22 | (2006.01) |
| G10L 15/01 | (2013.01) |

(52) U.S. Cl.
CPC ............ *G10L 15/34* (2013.01); *G06F 3/167* (2013.01); *G10L 15/22* (2013.01); *G10L 15/30* (2013.01); *G10L 15/01* (2013.01); *G10L 2015/223* (2013.01)

(58) Field of Classification Search
None
See application file for complete search history.

(56) References Cited

U.S. PATENT DOCUMENTS

| 6,204,763 | B1 | 3/2001 | Sone |
| 8,364,694 | B2 | 1/2013 | Volkert |
| 9,355,110 | B1 | 5/2016 | Chi |
| 9,558,735 | B2 | 1/2017 | Roberts et al. |
| 2004/0049389 | A1 | 3/2004 | Marko et al. |
| 2008/0189390 | A1 | 8/2008 | Heller et al. |
| 2009/0030697 | A1 | 1/2009 | Cerra et al. |

(Continued)

FOREIGN PATENT DOCUMENTS

| WO | WO2014055076 | 4/2014 | |
| WO | WO 2015/041892 | * 3/2015 | ............ G10L 15/00 |
| WO | WO2016085776 | 6/2016 | |

OTHER PUBLICATIONS

PCT Search Report and Written Opinion dated May 31, 2019 for PCT Application No. PCT/US2019/023704, 11 pages.

*Primary Examiner* — Antim G Shah
(74) *Attorney, Agent, or Firm* — Lee & Hayes, P.C.

(57) ABSTRACT

A speech interface device is configured with "hybrid" capabilities, which allows the speech interface device to perform actions in response to user speech, even when the speech interface device is unable to communicate with a remote system over a wide area network (e.g., the Internet). A hybrid request selector of the speech interface device sends audio data representing user speech to both a remote speech processing system and a local speech processing component executing on the speech interface device, and then waits for a response from either or both components. The local speech processing component may start execution based on the audio data and subsequently suspend the execution until further instruction from the hybrid request selector. The hybrid request selector can then determine which response to use, and, depending on which response is chosen, may instruct the local speech processing component to either continue or terminate the suspended execution.

19 Claims, 5 Drawing Sheets

(56) References Cited

U.S. PATENT DOCUMENTS

| | | | |
|---|---|---|---|
| 2009/0030698 A1 | 1/2009 | Cerra et al. | |
| 2010/0088100 A1 | 4/2010 | Lindahl | |
| 2010/0145683 A1* | 6/2010 | Schroeter | H04M 1/72522 704/201 |
| 2010/0169075 A1 | 7/2010 | Raffa et al. | |
| 2011/0038613 A1 | 2/2011 | Buchheit | |
| 2012/0179469 A1* | 7/2012 | Newman | G10L 15/30 704/270 |
| 2013/0007208 A1 | 1/2013 | Tsui et al. | |
| 2013/0085586 A1 | 4/2013 | Parekh | |
| 2013/0132084 A1* | 5/2013 | Stonehocker | G10L 15/30 704/244 |
| 2013/0132086 A1* | 5/2013 | Xu | G10L 15/01 704/257 |
| 2013/0151250 A1* | 6/2013 | VanBlon | G10L 15/32 704/235 |
| 2013/0173765 A1 | 7/2013 | Korbecki | |
| 2014/0019573 A1 | 1/2014 | Swift | |
| 2014/0088967 A1* | 3/2014 | Kawamura | G10L 15/30 704/251 |
| 2015/0006184 A1 | 1/2015 | Marti et al. | |
| 2015/0025890 A1* | 1/2015 | Jagatheesan | G10L 15/32 704/255 |
| 2015/0134334 A1 | 5/2015 | Sachidanandam et al. | |
| 2015/0199967 A1 | 7/2015 | Reddy et al. | |
| 2015/0279352 A1* | 10/2015 | Willett | G10L 15/30 704/231 |
| 2016/0035348 A1* | 2/2016 | Kleindienst | G06F 16/90332 704/235 |
| 2016/0098998 A1 | 4/2016 | Wang et al. | |
| 2016/0103652 A1 | 4/2016 | Kuniansky | |
| 2016/0342383 A1 | 11/2016 | Parekh | |
| 2016/0378747 A1 | 12/2016 | Orr et al. | |
| 2016/0379626 A1* | 12/2016 | Deisher | G10L 15/30 704/232 |
| 2018/0352295 A1* | 12/2018 | Deshpande | H04N 21/4755 |
| 2019/0027130 A1* | 1/2019 | Tsunoo | G10L 15/22 |

\* cited by examiner

HYBRID SPEECH INTERFACE DEVICE

BACKGROUND

Homes and other user premises are increasingly equipped with always-on Internet or "cloud" connectivity. The constant, or nearly constant, availability of wide area network communications, in combination with increasing capabilities of computing devices—including hands-free, speech interface devices—have created a number of new possibilities for services that use voice assistant technology with in-home connected devices. For example, various cloud-based services (e.g., music streaming, smart home control, etc.) may be accessible to users through convenient, hands-free interaction with their in-home speech interface devices.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
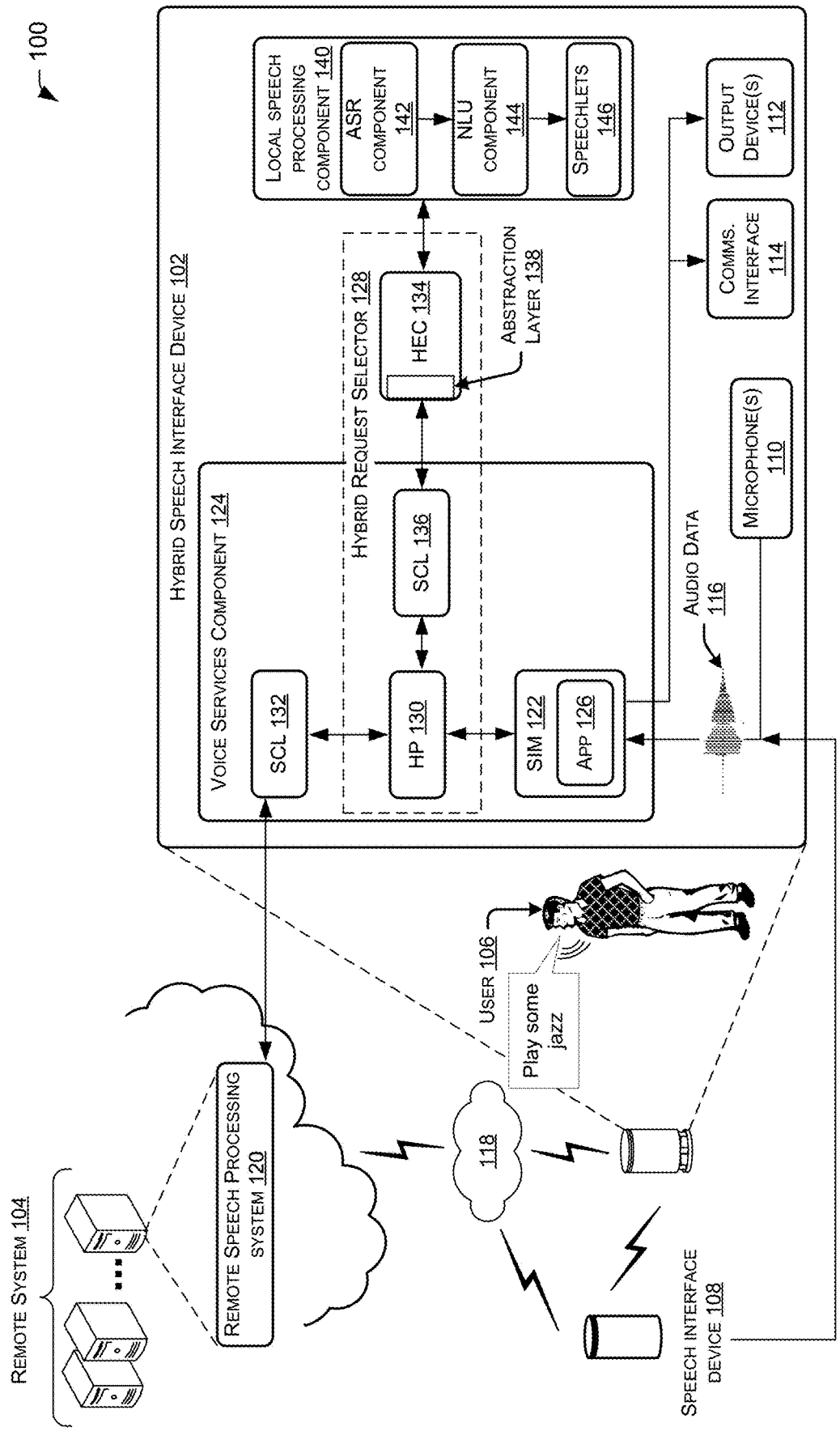
FIG. 1 is a block diagram illustrating a system including a hybrid speech interface device that is capable of responding to user speech, regardless of whether a remote system is available to the hybrid speech interface device.

Described herein are, among other things, techniques, devices, and systems, including a speech interface device with "hybrid" functionality, for responding to user speech. The "hybrid" functionality of the speech interface device allows the speech interface device to respond to user speech even in instances when a remote system—which, when available, can be used for processing user speech remotely—is, for example, unavailable to, slower than (with network-related latency factored in), or otherwise less preferred than the speech interface device. For instance, microphone(s) of a speech interface device may reside within an environment (e.g., in a home, automobile, office, hotel, etc.), perhaps along with one or more additional devices (including, for example, other speech interface devices, one or more second devices, such as home automation devices, mobile phone, tablet, TV, wireless speaker, etc.). In a "connected" condition, the speech interface device is able to connect to a remote system over a wide area network so that the remote system can provide speech processing for responding to user speech that occurs locally in the environment. However, the speech interface device may leverage its "hybrid" capabilities to process user speech locally on the speech interface device, and, in some instances, the speech interface device may generate directive data locally, which can be used to perform an action at the speech interface device, without assistance from the remote system. With this capability, the speech interface device can respond to user speech (e.g., by outputting audible responses or other content, and/or by controlling second devices in the environment, etc.), even when the speech interface device is unable to communicate with the remote system over a wide area network (e.g., the Internet).

In some embodiments, the speech interface device described herein is configured to "listen" for utterances of a user in the environment of the speech interface device, and/or receive audio data from other speech interface devices in the environment that detect such utterances. In either case, a voice services component of the speech interface device may receive this audio data representing user speech, and may send the audio data to a remote speech processing system executing on a remote system. A component of the speech interface device (sometimes referred to herein as the "hybrid request selector") is configured to receive the audio data being sent to the remote system. The audio data can also pass through the hybrid request selector to or otherwise be sent to the remote system. The hybrid request selector can provide the audio data as input to one or more local speech processing components executing on the speech interface device. With the audio data sent to both the remote speech processing system and the local speech processing component(s), the hybrid request selector may wait to receive a response with data from either or both of the remote system or the local speech processing component. The hybrid request selector may receive a response from the local speech processing component. This local response may include data indicating that the local speech processing component has started execution based on the audio data (e.g., by processing the audio data to determine intent data) and subsequently suspended the execution until further instruction from the hybrid request selector. It is to be appreciated that, depending on the current availability of the remote system, the hybrid request selector may or may not receive a response from the remote system, in this scenario.

Once one or more of the responses are received, the hybrid request selector can determine whether to respond to the user speech with directive data generated by the local speech processing component. If the hybrid request selector chooses to respond with directive data generated by the local speech processing component, the hybrid request selector may instruct the local speech processing component to continue its execution based on the audio data (e.g., to generate directive data based on a locally-determined intent), and the hybrid request selector, upon receiving the directive data from the local speech processing component, may forward the locally-generated directive data to a downstream component of the voice services component, which causes the speech interface device to perform an action based at least in part on the locally-generated directive data. On the other hand, if a response from the remote system is received, and if the hybrid request selector chooses to respond to the user speech with directive data received from the remote system, the hybrid request selector can instruct the local speech processing component to terminate its execution based on the audio data, which may, for example, cause the local speech processing component to refrain from generating directive data, and the hybrid request selector may forward the remotely-generated directive data to a downstream component of the voice services component, which causes the speech interface device to perform an action based at least in part on the remotely-generated directive data.

A speech interface device with "hybrid" functionality, as described herein, can provide operability to respond to user speech in an environment, even in instances when the Internet is down, and/or when a remote system—that can be relied upon, under certain conditions, to process speech for performing various actions—cannot otherwise be reached or is otherwise slow to respond. This functionality can enable many offline use cases and/or "local-preferred" use cases, such as music playback, navigation, communication, home automation, and so on. To illustrate, consider a scenario when a storm causes the Internet to go down, and the remote system is unavailable to the speech interface device. In this scenario, a user may nevertheless be able to ask the speech interface device to "Play some jazz", and the user can get an appropriate response from the speech interface device (e.g., by playing Jazz music from a locally-accessible music library of the user), and/or the user may be able to turn on a light in his/her house by uttering the expression "turn on the living room light" in the vicinity of the speech interface device. As another example, consider a scenario where a user is driving in an automobile equipped with a speech interface device, and that the user is driving through a remote geographical area with variable/limited connectivity to a wide area network. In this scenario, the user may nevertheless be able to turn on his/her smart automobile's high beams by uttering the expression "turn on the brights," even when the remote system is unavailable to the speech interface device at the time the utterance is detected. Accordingly, such a speech interface device provides a good user experience by functioning in environments where there is variable (or nonexistent) network availability, and by leveraging local resources to a greater degree, when available, which may be the a preference in an enterprise environment or a hotel environment where a repository of local media is accessible for providing content to employees or guests. The speech interface device described herein also uses local compute resources in optimal ways, such as by implementing response selection and directive arbitration logic at the speech interface device with minimal impact on the response latency. Compute resources of the speech interface device may also be conserved by the hybrid request selector's ability to terminate local execution of speech processing operations in particular scenarios, such as when the hybrid request selector determines that a local response is not going to be used to respond to user speech.

FIG. 1 is a block diagram illustrating a system 100 including a hybrid speech interface device 102 (often shortened herein to "speech interface device 102"). The speech interface device 102, having "hybrid" capabilities, is capable of responding to user speech, regardless of whether a remote system 104 is available to the speech interface device 102. The speech interface device 102 may be located within an environment to provide various capabilities to a user 106, when the user 106 is also in the environment. The environment in which the speech interface device 102 is located may be a home or other premises, an automobile, or any similar environment. Such an environment may include other devices including additional speech interface devices, such as the speech interface device 108, and/or second devices (e.g., Internet of Things (IoT) devices and/or smart home devices like thermostats, lights, refrigerators, ovens, etc.) that may be controllable by speech interface devices, such as the speech interface device 102. When acting as a hub, the speech interface device 102 may be configured to connect a plurality of devices in an environment and control communications among them, thereby serving as a place of convergence where data arrives from one or more devices, and from which data is sent to one or more devices.

In general, the speech interface device 102 may be capable of capturing utterances with a microphone(s) 110, and responding in various ways, such as by outputting content via an output device(s) 112, which may be a speaker(s), a display(s), or any other suitable output device 112. In addition, the speech interface device 102 may be configured to respond to user speech by controlling second devices that are collocated in the environment with the speech interface device 102, such as by sending a command to a second device via a communications interface 114 (e.g., a short range radio), the command instructing an operation to be performed at the second device (e.g., to turn on a light in the environment). FIG. 1 also shows that, in addition to using the microphone(s) 110 to capture utterances as audio data 116, the speech interface device 102 may additionally, or alternatively, receive audio data 116 (e.g., via the communications interface 114) from another speech interface device 108 in the environment, such as when the other speech interface device 108 captures an utterance from the user 106 and sends the audio data 116 to the speech interface device 102. This may occur in situations where the other speech interface device 108 would like to leverage the "hybrid" capabilities of the speech interface device 102.

As mentioned, under normal conditions, the speech interface device 102 may operate in conjunction with and/or under the control of a remote, network-based or network-accessible control system 104 (abbreviated to "remote system" 104 in FIG. 1). The remote system 104 may, in some instances be part of a network-accessible computing platform that is maintained and accessible via a wide area network 118. Network-accessible computing platforms such as this may be referred to using terms such as "on-demand computing", "software as a service (SaaS)", "platform computing", "network-accessible platform", "cloud services", "data centers", and so forth. The remote system 104 may be configured to provide particular functionality to large numbers of local (e.g., in-home, in-car, etc.) devices of different users.

In some embodiments, the remote system 104 may be configured to receive audio data 116 from the speech interface device 102, to recognize speech in the received audio data 116 using a remote speech processing system 120, and to perform functions in response to the recognized speech. In some embodiments, these functions involve sending directives, from the remote system 104, to the speech interface device 102 to cause the speech interface device 102 to perform an action, such as output an audible response to the user speech via a speaker(s) (i.e., an output device(s) 112), and/or control second devices in the environment by sending a control command via the communications interface 114. Thus, under normal conditions, when the speech interface device 102 is able to communicate with the remote system 104 over a wide area network 118 (e.g., the Internet), some or all of the functions capable of being performed by the remote system 104 may be performed by sending a directive(s) over the wide area network 118 to the speech interface device 102, which, in turn, may process the directive(s) for performing an action(s). For example, the remote system 104 may instruct the speech interface device 102 to output an audible response (e.g., using text-to-speech (TTS)) to a user's question, to output content (e.g., music) via a speaker of the speech interface device 102, and/or to turn on a light in the environment. It is to be appreciated that the remote system 104 may be configured to provide other functions in addition to those discussed herein, such as, without limitation, conducting an electronic commerce transaction on behalf of the user 106 as part of a shopping function, establishing a communication session between the user 106 and another user, and so on.

In the example of FIG. 1, the user 106 is shown as uttering the expression "Play some jazz." Whether this utterance is captured by the microphone(s) 110 of the speech interface device 102 or captured by another speech interface device 108 in the environment, the audio data 116 representing this user's speech is ultimately received by a speech interaction manager (SIM) 122 of a voice services component 124 executing on the speech interface device 102. The SIM 122 may manage received audio data 116 by processing utterances as events, and the SIM 122 may also manage the processing of directives that are used to respond to the user speech (e.g., by controlling the action(s) of the speech interface device 102). The SIM 122 may include one or more client applications 126 or skills for performing various functions at the speech interface device 102.

A hybrid request selector 128 (or, hybrid request selector component 128) of the speech interface device 102 is shown as including a hybrid proxy (HP) 130 (or, hybrid proxy (HP) subcomponent 130), among other components. The HP 130 can be implemented as a layer within the voice services component 124 that is located between the SIM 122 and a speech communication library (SCL) 132, and may be configured to proxy traffic to/from the remote system 104. For example, the HP 130 may be configured to pass messages between the SIM 122 and the SCL 132 (such as by passing events and directives there between), and to send messages to/from a hybrid execution controller (HEC) 134 (or, hybrid execution controller (HEC) subcomponent 134) via a second SCL 136. By "hooking into" the HP 130, the HEC 134 is given the ability to "snoop" on communication between the SIM 122 and the remote system 104 via the SCL 132. For instance, directive data received from the remote system 104 can be sent to the HEC 134 using the HP 130, which sits in the path between the SCL 132 and the SIM 122. The HP 130 may also be configured to allow audio data 116 received from the SIM 122 to pass through to the remote speech processing system 120 (via the SCL 132) while receiving this audio data 116 and sending the received audio data 116 to the HEC 134 via the SCL 136. It is to be appreciated that, in order to minimize any latency introduced by the implementation of the hybrid request selector 128—which "snoops" on communications with the remote system 104 and implements selection logic for choosing which response to use for responding to user speech—the HP 130 may be limited in its functionality to merely passing/sending messages with relatively simple filtering tools.

As shown in FIG. 1, the HEC 134 may implement an abstraction layer 138, which allows the HEC 134 to handle different transports and protocols when messages and data are received from other devices in the environment. That is, in order to operate in conjunction with various other types of devices in the environment, which may implement various different protocols (e.g., v1, v2, v20160207, Locutus, etc.) over various transport mechanisms (Hypertext Transfer Protocol (HTTP)1.1, HTTP/2, SPDY, etc.), the abstraction layer 138 can be used to accept these various types of protocols and converge them to a common protocol, such as by using a protocol translator. This can allow the speech interface device 102 to receive traffic from third party devices that do not conform to the protocol used by the speech interface device 102, and/or to receive traffic from legacy devices that use out-of-date protocols, which can be up-converted to a protocol used by the speech interface device 102 using the abstraction layer 138.

The HEC 134 may act as a local endpoint, allowing other components to reach a local speech processing component 140 that is configured to process audio data 116 representing user speech. The HEC 134 may further control the execution of the local speech processing component 140, such as by sending "execute" and "terminate" events/instructions to the local speech processing component 140. An "execute" event may instruct the local speech processing component 140 to continue its execution based on audio data 116 (e.g., by instructing the local speech processing component 140 to execute on a previously-determined intent in order to generate a directive). Meanwhile, a "terminate" event may instruct the local speech processing component 140 to terminate further execution based on the audio data 116, such as when the speech interface device 102 receives directive data from the remote system 104 and chooses to use that remotely-generated directive data.

The components of the hybrid request selector 128 may communicate with other components, and/or between themselves, using an application programming interface(s) (API(s)). For instance, the HEC 134 may communicate with the local speech processing component 140 using a suitable API, such as, without limitation, a C++ API. The API used by the HEC 134 to communicate with the local speech processing component 140 may be capable of passing messages (e.g., events and directives) as JavaScript Object Notation (JSON) objects, and these messages can have binary data attachments.

In the example of FIG. 1, where the user 106 utters the expression "Play some jazz," the audio data 116 is received by the SIM 122 of the voice services component 124. The SIM 122 may send the audio data 116 through the HP 130 of the hybrid request selector 128, which allows the audio data 116 to pass through to the SCL 132, and the SCL 132, in turn, sends the audio data 116 over the wide area network 118 to the remote system 104 for processing speech remotely. The wide area network 118 is representative of any type of public or private, wide-area network, such as the Internet, which extends beyond the environment of the speech interface device 102. Thus, the wide area network 118 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

The HP 130 may also receive the audio data 116 and send the received audio data 116 to the HEC 134 via the second SCL 136. The HEC 134 may then input the audio data 116 to the local speech processing component 140. At this point, the hybrid request selector 128 may wait for a response from either or both of the remote system 104 or the local speech processing component 140.

The local speech processing component 140 is configured to receive the audio data 116 from the HEC 134 of the hybrid request selector 128 as input, to recognize speech in the audio data 116, to determine user intent from the recognized speech, and to determine how to act on the user intent by generating a directive (or directive data). In some cases, a directive may include a description of the intent (e.g., an intent to play jazz music). In some cases, a directive may include (e.g., encode) an identifier of a second device, and an operation to be performed at the second device.

In some embodiments, the speech interface device 102 may be configured to compare the audio data 116 to stored models used to detect a wakeword that indicates to the speech interface device 102 that the audio data 116 is to be processed for determining an intent. In some embodiments, the hybrid request selector 128 may send the audio data 116 to the local speech processing component 140 to have the local speech processing component 140 determine whether a wakeword is detected in the audio data 116, and, if a wakeword is detected, this indication may be provided to the hybrid request selector 128 so that the hybrid request selector 128 can proceed with sending the audio data 116 to the remote speech processing system 120 while the local speech processing component 140 continues processing the audio data 116 in parallel. If the local speech processing component 140 does not detect a wakeword in the audio data 116, this indication may be provided to the hybrid request selector 128 so that the hybrid request selector 128 can refrain from sending the audio data 116 to the remote speech processing system 120, and the local speech processing component 140 may halt further operations after determining that audio data 116 does not include the wakeword. The audio data 116 can be discarded in this situation.

Among other logical and physical components, the local speech processing component 140 may include an automatic speech recognition (ASR) component 142 that is configured to perform ASR on the audio data 116 to convert the audio data 116 into ASR text data. ASR transcribes audio data into text data representing the words of the user speech contained in the audio data 116. A spoken utterance in the audio data can be input to the ASR component 142, which then interprets the utterance based on the similarity between the utterance and pre-established language models available to the local speech processing component 140. For example, the ASR component 142 may compare the input audio data 116 with models for sounds (e.g., subword units or phonemes) and sequences of sounds to identify words that match the sequence of sounds spoken in the utterance of the audio data 116. In some embodiments, the ASR component 142 outputs the most likely text recognized in the audio data 116, or multiple hypotheses in the form of a lattice or an N-best list with individual hypotheses corresponding to confidence scores or other scores (such as probability scores, etc.). In some embodiments, the ASR component 142 is customized to the user 106 (or multiple users) who created a user account to which the speech interface device 102 is registered. For instance, the language models (and other data) used by the ASR component 142 may be based on known information (e.g., preferences) of the user 106, and/or on a history of previous interactions with the user 106.

The local speech processing component 140 may also include a natural language understanding (NLU) component 144 that performs NLU on the generated ASR text data to determine an intent so that directives may be determined based on the intent. Generally, the NLU component 144 takes textual input (such as processed from the ASR component 142) and attempts to make a semantic interpretation of the ASR text data. That is, the NLU component 144 determines the meaning behind the ASR text data based on the individual words, and then the NLU component 144 can implement that meaning. The NLU component 144 interprets a text string to derive an intent or a desired action or operation from the user 106. This may include deriving pertinent pieces of information in the text that allow the NLU component 114 to identifying a second device in the environment, if the user, for example, intends to control a second device (e.g., a light in the user's 106 house). In the example of FIG. 1, the ASR component 142 may outputs the ASR text "Play some jazz," and the NLU component 144 may determine that the user intended to play jazz music. The local speech processing component 140 may also provide a dialog management function to engage in speech dialogue with the user 106 to determine (e.g., clarify) user intents by asking the user 106 for information using speech prompts. In some embodiments, the NLU component 144 is customized to the user 106 (or multiple users) who created a user account to which the speech interface device 102 is registered. For instance, data used by the NLU component 144 to understand the meaning of ASR text may be based on known information (e.g., preferences) of the user 106, and/or on a history of previous interactions with the user 106.

The local speech processing component 140 may also include, or be configured to use, one or more installed speechlets 146. Speechlets 146 may represent domains that are used in order to determine how to act on an utterance in a particular way, such as by outputting a directive that corresponds to the determined intent, and which can be processed to implement the desired operation. Accordingly, the term "speechlet" may be used interchangeably with the term "domain" or "domain implementation." The speechlets 146 installed on the speech interface device 102 may include, without limitation, a music speechlet 146 (or music domain) to act an utterances with intents to play music on a device, such as via a speaker(s) of the speech interface device 102, a shopping speechlet 146 (or shopping domain) to act on utterances with intents to buy an item from an electronic marketplace, and/or a device control speechlet 146 (or device control domain) to act on utterances with intents to control a second device(s) in the environment.

Upon determining an intent based on the audio data 116, the local speech processing component 140 may send first data to the HEC 134 of the hybrid request selector 128. This first data from the local speech processing component 140 may indicate that the local speech processing component 140 has started execution based on the audio data 116 (e.g., by determining intent data) and subsequently suspended the execution until further instruction from the HEC 134. For example, the HEC 134 may receive first data from the local speech processing component 140 in the form of a "ReadyToExecute" directive (or signal), which indicates that the local speech processing component 140 has recognized an intent, or is ready to communicate failure (if the local speech processing component 140 could not recognize an intent via the NLU component 144).

The first data from the local speech processing component 140 that is received by the HEC 134 may also include additional bits of information, such as preference data (e.g., a "preferLocal" bit or Boolean value) to indicate a preference for responding to the user speech with locally-generated directive data. An intent registry available to the NLU component 144 and/or a pre-execution response from a speechlet 146 or from a skill may be used to determine whether to execute an intent locally using the local speech processing component 140. For example, a "preferLocal" bit can be set to a Boolean value of "true" if there is a preference for executing the intent by the local speech processing component 140, or to a Boolean value of "false" if there is no preferences for executing the intent locally. Examples where the "preferLocal" bit may be set to a Boolean value of "true" include playing a local media file (from local storage), controlling a home appliance registered exclusively on a local network, vehicle telematics, etc. In one illustrative example, a user 106 may have been playing music from a local source, and the user 106 utters an expression "Play some jazz" without specifying a different source. The preference data, in this illustrative example, may be indicate a preference for responding to the user speech with locally-generated directive data, and by playing music from the local source (e.g., a local music library), without reliance on the remote system 104. In other scenarios, some skills (or client applications 126) may be exclusively available on the speech interface device 102, and the remote system 104 may not have access to the skill that is available on the speech interface device 102, such as a skill that provides functionality in an automobile, without reliance on the remote system 104 to implement that functionality. In these scenarios, the HEC 134 can be made aware of exclusively local skills through the preference data (e.g., the "preferLocal" bit or Boolean value), which means that the HEC 134 may not wait for a response from the remote system 104 if, for example, the "preferLocal" bit is set to a value of "true" to indicate that the skill is exclusively available on the speech interface device 102, and is not available on the remote system 104. In yet another example, the speech interface device 102 may have access second devices in the environment that may allow the speech interface device 102 to determine an intent with high confidence, as compared to a remote speech processing components 120 ability to recognize the intent with the same, high confidence. In an illustrative example, the user 106 may utter the expression "Call Mom," and because the speech interface device 102 can access a contact list from the user's 106 smart phone that is located in the vicinity of the speech interface device 102, the speech interface device 102 can determine a favorite contact with the name "Mom," and determine that the user's 106 intent is to call that particular phone number that is saved as a favorite in the user's 106 smart phone. In this illustrative example, preference data in the local response may be used to indicate, to the HEC 134, a preference for using the locally-recognized intent in lieu of using a remotely-recognized intent. Accordingly, if such preference data indicates a preference for responding to the user speech with locally-generated directive data, the HEC 134 may instruct the local speech processing component 140 to continue its execution based on the audio data to generate directive data, and may instruct the HP 130 to ignore (or refrain from sending to the SIM 122 of the voice services component 124) second directive data from the remote system 104, if remotely-generated directive data is received at all.

Additionally, or alternatively, the first data from the local speech processing component 140 that is received by the HEC 134 may include capability data (e.g., an "isCapabilityPresent" bit or Boolean value) to indicate the availability, or an unavailability, of a local speechlet 146 for responding to the user speech. An intent registry available to the NLU component 144 and/or a pre-execution response from a speechlet 146 may be used to determine whether a local speechlet 146 is available or unavailable for responding to the user speech. For example, an "isCapabilityPresent" bit can be set to a Boolean value of "true" if there is a local speechlet 146 that is capable of handling an event corresponding to the user speech (or the audio data 116 representing the user speech), or to a Boolean value of "false" if none of the local speechlets 146 are capable of handling the event.

Additionally, or alternatively, the first data from the local speech processing component 140 that is received by the HEC 134 may include a confidence score (e.g., 0 to 100%) associated with an intent determined by the local speech processing component 140 based on the audio data 116, indicating the NLU component's 144 confidence of intent recognition.

Upon the HEC 134 receiving first data in the form of a "ReadyToExecute" response from the local speech processing component 140, further execution by the local speech processing component 140 may be suspended until further instruction from the HEC 134, where, depending on data available to the HEC 134, the HEC 134 is configured to instruct the local speech processing component 140 to either (a) continue the execution (e.g., by continuing execution of the intent to generate directive data), or (b) terminate the execution (e.g., by refraining from generating directive data).

Depending on the availability of the remote system 104, a response from the remote system 104 may or may not be received, and the timing of the receipt of such a response may vary (e.g., a response from the remote system 104 may be received before or after a response from the local speech processing component 140). In any scenario, the HEC 134 of the hybrid request selector 128 is configured to determine whether to respond to the user speech with directive data generated by the local speech processing component 140, or, if a response from the remote system 104 is received, whether to respond to the user speech with second directive data received from the remote system 104. When a response (second data) from the remote system 104 is received by the SCL 132 for example, the HP 130 may send this second data, including remotely-generated directive data, to the HEC 134 via the SCL 136. The HEC 134 can then implement selection logic to choose which response to utilize in responding to the user speech.

If the HEC 134 determines to respond to the user speech with directive data generated by the local speech processing component 140, the HEC 134 may instruct the local speech processing component 140 to continue its execution based on the audio data 116. For example, the HEC 134 may send an "Execute" event to the local speech processing component 140 instructing the local speech processing component 140 to execute on the determined intent, and continue handling the suspending event by generating directive data. Upon the HEC 134 receiving this locally-generated directive data, the HEC 134 may forward the locally-generated directive data to the HP 130, which sends the locally-generated directive data to the SIM 122 of the voice services component 124. The voice services component 124 (possibly with the use of a client application 126) may process the locally-generated directive data to cause the speech interface device to perform an action, such as outputting content via an output device 112; in this case, outputting jazz music via one or more speakers of the speech interface device 102.

If, on the other hand, the HEC 134 determines to respond to the user speech with directive data received from the remote system 104 (assuming a response from the remote system 104 was received and sent via the HP 130 to the HEC 134), the HEC 134 may instruct the local speech processing component 140 to terminate its execution based on the audio data 116. For example, the HEC 134 may send a "Terminate" event to the local speech processing component 140 instructing the local speech processing component 140 to abandon the previously-suspended event by refraining from generating directive data. Not only does this help avoid a double intent execution issue, but it conserves compute resources on the speech interface device 102 by avoiding operations required to generate directive data locally.

The HEC 134 can also instruct the HP 130 to perform directive arbitration in a particular manner, depending on the decision of the HEC 134 in terms of which response to use for responding to the user speech. That is, if the HEC 134 determines to respond to the user speech with directive data generated by the local speech processing component 140 (in lieu of directive data that may be received from the remote system 104), the HEC 134 can send a "Choose" directive (or signal) to the HP 130 instructing the HP 130 to send locally-generated directive data to the SIM 122 of the voice services component 124, and to ignore, or refrain from sending, remotely-generated directive data (if any is received) to the SIM 122. If the HEC 134 determines instead to respond to the user speech with directive data received from the remote system 104 (in lieu of directive data generated by the local speech processing component 140), the HEC 134 can send a "Choose" directive (or signal) to the HP 130 instructing the HP 130 to send remotely-generated directive data to the SIM 122, and to ignore, or refrain from sending, locally-generated directive data to the SIM 122. This filtering (or directive arbitration) performed by the HP 130 (based on an instruction from the HEC 134) also avoids a double intent execution issue, such as the speech interface device 102 performing two actions, which, in some cases, may be identical actions.

Accordingly, under normal conditions—when a wide area network connection is available to the speech interface device 102—the hybrid request selector 128 of the speech interface device 102 may receive a directive from the remote system 104 and may end up using that directive in lieu of using a locally-generated directive. Assuming the remote speech processing system 120 recognizes an intent and is capable of responding (e.g., a remote speechlet is available), there may be a preference for using the directive received from the remote system 104. This preference for remotely-generated directives, when available, may be based on the notion that local ASR and NLU may match the level of performance achievable by remote ASR and NLU components, which are often less-resource-constrained at the remote system 104. For example, the speech interface device 102 is likely to have constrained resources (e.g., processing resources, memory resources, etc.) as compared to the computing resources available to the remote system 104. Thus, the level of quality provided by local speech processing may be lower than the quality level achievable by remote speech processing systems. However, in some cases, such as when connectivity to the wide area network 118 is down, and/or when the local speech processing component 140 may be faster or better at responding to a particular utterance, the locally-generated directive may be used to provide a better user experience (e.g., a faster or better response). In any case, the hybrid request selector 128 may use a response (second data) from the remote system 104 without waiting for first data to be received from the local speech processing component 140, and vice versa, regardless of the availability status of the remote system 104.

It is to be appreciated that the local speech processing component 140 may be configured to generate, as output, directive data that is formatted in a same, or a similar, format used by the remote speech processing system 120 of the remote system 104. Thus, when a directive is generated by the local speech processing component 140, the directive can be processed by downstream components of the speech interface device 102 in the same way that a directive received from the remote system 104 would be processed. Thus, the downstream components of the speech interface device 102 (e.g., the SIM 122 of the voice services component 124) may be unaware of the fact that the speech interface device 102 may be processing speech locally (e.g., when the Internet is down) because directives generated by the local speech processing component 140 may be formatted in the same or similar way that remotely-generated directives are formatted, which makes the local speech processing "transparent" to the downstream components of the speech interface device 102 that process directives.

In an example, directive data that is generated by a domain/speechlet of the remote speech processing system 120 and/or the local speech processing component 140 may be formatted using Java, such as JavaScript syntax, or JavaScript-based syntax. This may include formatting the directive using JSON. In some embodiments, such a locally-generated directive may be serialized, much like how remotely-generated directives are serialized for transmission in data packets over the wide area network 118. In other embodiments, a locally-generated directive is formatted as a programmatic application programming interface (API) call with a same logical operation as a remotely-generated directive. In other words, a locally-generated directive may mimic remotely-generated directives by using a same, or a similar, format as the remotely-generated directive.

An example structure of a locally-generated directive may include a header object, an endpoint object, and a payload object. The header object may include a set of fields that provide different types of identifying information (sometimes called "properties"). Header properties may include, without limitation, a namespace (e.g., for specifying a category for the message payload, e.g., "Speech Synthesizer,"), a name (e.g., "Speak"), a message identifier (ID) (e.g., a unique identifier for a single request or response), a correlation token (e.g., to identify a directive, and possibly events associated therewith), a payload version (e.g., version of the capability interface applied to the message), a "keys" section, etc. A "ReadyToExecute" response (first data) received by the HEC 134 from the local speech processing component 140 may have a similar data structure with similar header properties. The aforementioned "data", such as the "preference data" (e.g., "preferLocal" bit), the "capability data" (e.g., "isCapabilityPresent" bit, and the like, may be included as header extensions, such as by adding values in the "keys" subsection of the header. An endpoint object may identify a target for a directive, and possibly an origin of an event. An endpoint, in this context, can represent a physical device, a virtual device, a group of devices, a software component. The endpoint may include an authentication token to enable communication with a device(s) or component represented by the endpoint. Endpoint properties may include, without limitation, a scope (e.g., a polymorphic object that provides authorization and identifying information for a message, and may include a token that identifies a user), an endpoint ID (e.g., a unique identifier corresponding to the endpoint), and a cookie (e.g., a list of key/value pairs associated with the endpoint).

Figure 2:
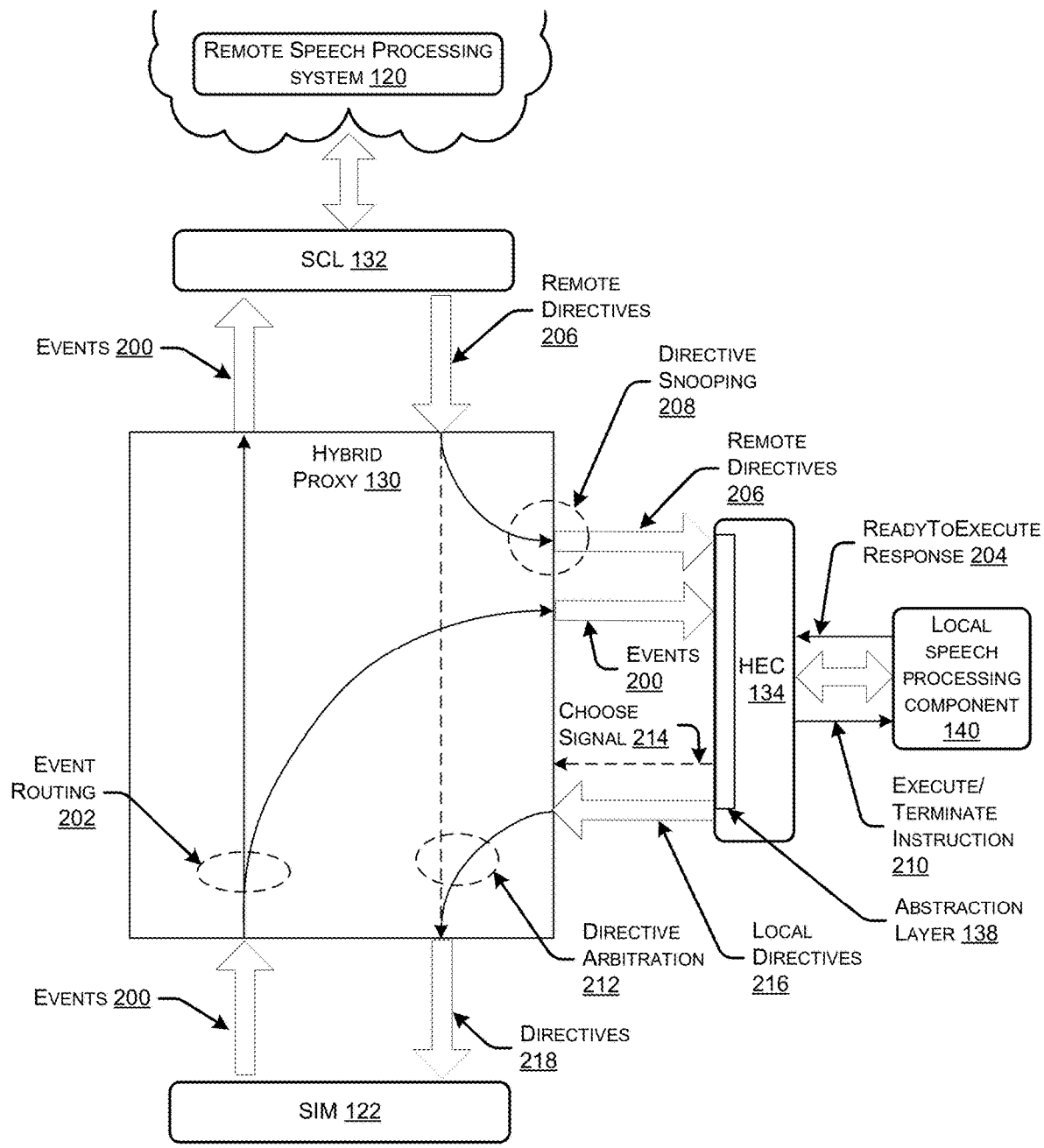
FIG. 2 is a schematic diagram shown example functionality of a hybrid proxy and a hybrid execution controller of a hybrid request selector.

FIG. 2 is a schematic diagram shown example functionality of a hybrid proxy (HP), such as the HP 130 introduced in FIG. 1, and a hybrid execution controller (HEC), such as the HEC 134 introduced in FIG. 1. Both the HP 130 and the HEC 134 may be components of the hybrid request selector 128 of FIG. 1. As shown in FIG. 2, the HP 130 can be implemented as a layer (in the voice services component 124) between the SIM 122 and the SCL 132 that communicates with the remote system 120. The HP 130 may be configured to direct and/or send messages between the SIM 122, the SCL 132, and the HEC 134, as shown in FIG. 2.

Whenever audio data 116 representing user speech is received by the SIM 122 of the voice services component 124, the SIM sends events 200 corresponding to this user speech to the HP 130. The HP 130 implements event routing 202 to send these speech-related events 200 to the SCL 132 for transmission to the remote speech processing system 120, and to the HEC 134 so that the HEC 134 can provide the audio data 116 corresponding to the events 200 as input to the local speech processing component 140. After starting execution based on the input audio data 116 (e.g., to derive an intent), the local speech processing component 140 may suspend its execution until further instruction from the HEC 134, and may respond to the HEC 134 with first data in the form of a "ReadyToExecute" response 204. As mentioned, this response 204 from the local speech processing component 140 may include additional information, such as preference data, capability data, a confidence score, etc. At a minimum, the response 204 from the local speech processing component 140 indicates that the local speech processing component 140 has recognized the intent or is ready to communicate a failure. Additionally, remote directives 206 received in responses (second data) from the remote system 104 may also be sent to the SIM 122 and also sent by the HP 130 to the HEC 134 to enable a "directive snooping" 208 capability of the hybrid request selector 128. Alternatively, the remote directives 206 can be fully intercepted or otherwise received by the HP 130 and sent to the HEC 134 (e.g., by not allowing the remote directives 206 to pass through the HP 130 directly to the SIM 122, without first being sent to the HEC 134). The dotted line through the HP 130 (going from the remote directives 206 to the directives 218) indicates that the remote directives 206 can, in some embodiments, be fully intercepted or otherwise received by the HP 130 when they are received from the SCL 132. In this case, the HP 130 may send the remote directives 206 to the HEC 134, without allowing the remote directives 206 to be sent directly to the SIM 122 without going through the HEC 134. In any case, these remote directives 206 can represent various types of directives including, without limitation, a voice capture (or stop) directive to indicate that the remote speech processing system 120 has received the audio data 116, believes the user 106 is done talking, and is able to handle the response, or an execution directive, which tells the speech interface device 102 how to respond (e.g., an action to perform). With the directive snooping 208 capability, the hybrid request selector 128 can "see" traffic from the remote system 104. Use of the HP 130 as a "thin" layer to send these remote directives 206 to the HEC 134 avoids the introduction of significant extra latency, as compared to an existing system that relies on the remote speech processing system 120 for responding to user speech. The configuration shown in FIG. 2 also does not impact local response latency, meaning that, if the HEC 134 determines to respond to user speech with a response from the local speech processing component 140, this will occur with about the same response time as it would have using the remote speech processing system 120 exclusively. Directives snooping 208 also allows the HEC 134 to make decisions regarding whether or not to terminate intent execution within the local speech processing component 140, such as by issuing an "Execute" instruction 210 or a "Terminate" instruction 210 to instruct the local speech processing component 140 to either continue or terminate its execution.

The HEC 134 can determine which response (i.e., local or remote) to use for responding to user speech, and may, in some embodiments, send an instruction to the HP 130 to tell the HP 130 how to perform directive arbitration 212. For example, a "Choose" signal 214 can be sent from the HEC 134 to the HP 130 to tell the HP 130 which directives to forward on, and which directives to ignore (or refrain from sending downstream). That is, the HP 130 may receive remote directives 206, and, if the HEC 134 instructs the local speech processing component 140 to continue its execution using an "Execute" instruction 210, the HP 130 may also receive local directives 216 generated by the local speech processing component 140. In some embodiments, the HEC 134 sends an "Execute" instruction 210, and forwards local directives 216 to the HP 130 in response to capability data in the response from the remote system 104 indicating that a remote speechlet is unavailable for responding to the user speech, and/or if preference data in the "ReadyToExecute" response 204 from the local speech processing component 140 indicates a preference for responding to the user speech with local directives 216.

The HEC 134 can use the "Choose" signal 214 to inform the HP 130 as to which directive to forward, and which directive to ignore, as shown by the directive arbitration 212 in FIG. 2. The directives 218 sent to the SIM 122 of the voice services component 124 are therefore either the remote directives 206 or the local directives 216, as decided by the selection logic of the HEC 134. In some embodiments, a "Choose" signal 214 is not provided to the HP 130. For example, the "Choose" signal 214 (an instruction sent from the HEC 134 to the HP 130) may be omitted in some embodiments, such as when the remote directives 206 are fully intercepted or otherwise received by the HP 130 without allowing them to proceed directly from the SCL 132 to the SIM 122. In this scenario, the HEC 134 may send either remote directives 206 or local directives 216 to the HP 130, which then forwards the directives it receives from the HEC 134 to the SIM 122. In this manner, the HP 130 does not receive an instruction that tells it which directives to forward to the SIM 122 and which directives to ignore; the HP 130 just forwards the directive(s) the HEC 134 chooses to send to the HP 130. Additionally, or alternatively, the "Choose" signal 214 may be omitted when local directives 216 are provided to the HP 130. In other words, the HP 130 may receive a local directive 216 and may take this as an implicit signal that the HEC 134 determined to respond to user speech using local directives 216. In some embodiments, the HP 130 may wait for a choose signal 214 before forwarding remote directives 206 to the SIM 122, such as when a remote directive 206 includes capability data indicating an unavailability of a remote speechlet for responding to the user speech.

In some embodiments, multi-turn dialog may be continued by a service that started it. Thus, if an event 200 received by the HP 130 from the SIM 122 is a continuation of a dialog, the event 200 is sent to the service that originated the dialog (e.g., the event 200 is either sent to the remote speech processing system 120 or the local speech processing component 140). A token may be provided in the payload of an event 200 and used by the HP 130 to determine where the event 200 of a multi-turn dialog is to be sent. For example, the token in the event 200 payload may be set by the SIM 122 to match a token in a payload of a received directive 218. On the other hand, a new event 200 that is not part of a multi-turn dialog, may omit such a token and, as a consequence, the new event 200 may be sent by the HP 130 to both the remote speech processing system 120 (via the SCL 132) and to the local speech processing component 140 (via the HEC 134).

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
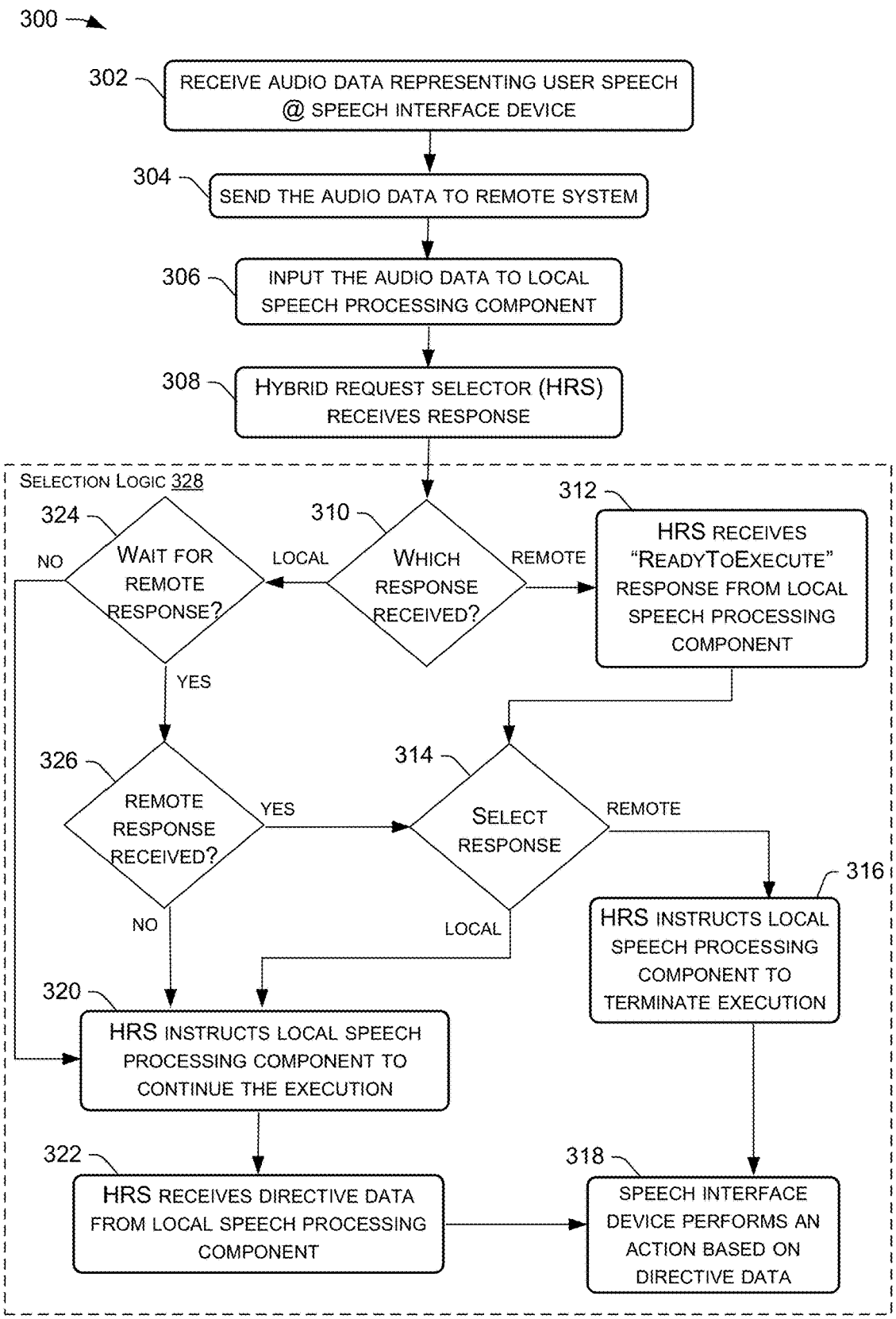
FIG. 3 is a flow diagram of an example process implemented by a hybrid speech interface device for responding to user speech, regardless of whether a remote system is available to the hybrid speech interface device.

FIG. 3 is a flow diagram of an example process 300 implemented by a hybrid speech interface device 102 for responding to user speech, regardless of whether a remote system 104 is available to the hybrid speech interface device 102. For discussion purposes, the process 300 is described with reference to the previous figures.

At 302, a voice services component 124 (e.g., a SIM 122) of a speech interface device 102 may receive audio data 116 that represents user speech.

At 304, the voice services component 124 (e.g., the SIM 122) may send the audio data 116 to a remote speech processing system 120 executing on a remote system 104. As depicted in the examples of FIGS. 1 and 2, the audio data 116 may be sent to the remote speech processing system 120 via a hybrid request selector (HRS) 128 (e.g., via the HP 130 of the HRS 128). Additionally, it is to be appreciated that the audio data 116 is sent, at block 304, to the remote speech processing system 120 via a wide area network 118. Accordingly, if it just so happens that the wide area network 118 is presently down (i.e., the speech interface device 102 cannot send data over the wide area network 118 to the remote system 104), the sending at block 304 can comprise "attempting to send" the audio data 116; because the audio data 116 may, in some instances, not be received by the remote speech processing system 120.

At 306, the audio data 116 may be input to a local speech processing component 140 executing on the speech interface device 102. This operation at block 306 may be performed by the HRS 128 of the speech interface device 102.

At 308, the HRS 128 may receive a response (i.e., a speech processing component response). It is to be appreciated that, in some situations, the HRS 128 may not receive any response from either component (local or remote). For example, if the Internet is down, and if the local speech processing component 140 is somehow inactive (e.g., frozen, crashed and in the process of recovering, etc.), the HRS 128 may not receive a response at all. These instances are expected to be rare, if they occur at all. However, FIG. 3 depicts a scenario where at least one response is received in order to illustrate the operations that may follow block 308 where a response is received.

At 310, the HRS 128 may determine which response was received at block 308; namely, a response from the remote system 104 or first data from the local speech processing component 140. If the response received at block 308 is a response (second data) from the remote system 104, the process 300 may follow the "REMOTE" route from block 310 to block 312 where the HRS 128 eventually receives first data (e.g., a "ReadyToExecute" response 204) from the local speech processing component 140 indicating that the local speech processing component 140 has started execution based on the audio data 116 and subsequently suspended the execution until further instruction from the HRS 128.

At 314, the HRS 128 may select one of the two responses by determining to respond to the user speech with either (i) first directive data generated by the local speech processing component 140 or (ii) second directive data received from the remote system. In following the "REMOTE" route from block 310, this second directive data would have been included in the response (data) received at block 308 from the remote system 104. If the HRS 128 determines to respond to the user speech with the second directive data received from the remote system, the process 300 may follow the "REMOTE" route from block 314 to block 316.

At 316, the HRS 128 may instruct the local speech processing component 140 to terminate the execution it suspended based on the audio data 116.

At 318, the voice services component 124 of the speech interface device 102 may cause the speech interface device 102 to perform an action based on the directive data. Following the "REMOTE" route from block 314 to block 316 and to block 318, this directive data represents the directive data received from the remote system 104. Furthermore, the action performed at block 318 can be any suitable action including, without limitation, outputting content (e.g., audio and/or video content) via an output device 112 of the speech interface device 102, sending a command to a second device collocated in an environment with the speech interface device 102, the command instructing an operation to be performed at the second device (e.g., turn on a light).

Returning to block 314, if the HRS 128 determines to respond to the user speech with the first directive data generated by the local speech processing component 140, the process 300 may follow the "LOCAL" route from block 314 to block 320.

At 320, the HRS 128 may instruct the local speech processing component 140 to continue the execution it suspended based on the audio data 116.

At 322, the HRS 128 may receive directive data from the local speech processing component 140, and at block 318, the voice services component 124 of the speech interface device 102 may cause the speech interface device 102 to perform an action based on the directive data. Following the "LOCAL" route from block 314 to block 320, to block 322, and to block 318, this directive data represents the directive data generated by the local speech processing component 140.

Returning to block 310, instead of a scenario where a response is received from the remote system 104 at block 308, the HRS 128 may determine that the response received at block 308 is first data (e.g., a "ReadyToExecute" response 204) from the local speech processing component 140, which may indicate that the local speech processing component 140 has started execution based on the audio data 116 and subsequently suspended the execution until further instruction from the HRS 128. In this scenario, the process 300 may follow the "LOCAL" route from block 310 to block 324 where the HRS 128 may determine whether to wait for a response from the remote system 104. If the HRS 128 determines to not wait for a response from the remote system 104 at block 324, the process 300 may follow the "NO" route from block 324 to block 320, then to block 322, and then to block 318, as described above (i.e., respond to the user speech using directive data from the local speech processing component 140 without waiting for a remote response).

If the HRS 128 determines to wait for a response from the remote system 104 at block 324, the process 300 may follow the "YES" route from block 324 to block 326 where the HRS 128 may determine if a remote response has been received within a period of time. The amount of time to wait for a remote response may vary and may be influenced by various factors, as will be described in more detail below. If a response from the remote system 104 is received within the period of time at block 326, the process 300 may follow the "YES" route from block 326 to block 314 where the HRS 128 may select one of the two responses by determining to respond to the user speech with either (i) first directive data generated by the local speech processing component 140 or (ii) second directive data received from the remote system, which dictates whether the process 300 follows the "REMOTE" route or the "LOCAL" route from block 314, as described above.

If a response from the remote system 104 is not received with the period of time at block 326, the process 300 may follow the "NO" route from block 326 to block 320, then to block 322, and then to block 318, as described above (i.e., respond to the user speech using directive data from the local speech processing component 140 after waiting for, but not receiving, a remote response).

Thus, the process 300 can be implemented at a speech interface device 102 to implement "hybrid" functionality that allows the speech interface device 102 to respond to user speech, even when a remote system 104 is unavailable to the speech interface device 102. As shown in FIG. 3, blocks 310-326 represent example selection logic 328 that can be used by the hybrid request selector 128 in deciding whether to use locally-generated directive data or remotely-generated directive data in responding to user speech.

It is to be appreciated that, in some embodiments, aspects of the selection logic 328 of the process 300 may utilize machine learning. Machine learning generally involves processing a set of examples (called "training data") in order to train a machine learning model(s). A machine learning model, once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In the context of the present disclosure, the input may include, inter alia, various features and data associated with one or more responses received by the HRS 128 from the remote system 104 and/or the local speech processing component 140, and the trained machine learning model(s) may be tasked with selecting one of the two responses (i.e., local or remote) to use in responding to user speech. Additionally, or alternatively, the trained machine learning model(s) may be used to predict or otherwise output a timeout period that instructs the HRS 128 to wait for a particular period of time for a remote response at block 324. Such a machine learning model(s) may be trained on past performance (measured by various metrics, including latency, customer satisfaction (from survey questions), etc.) using unsupervised, semi-supervised, and/or supervised machine learning techniques. In some embodiments, the machine learning model(s) may be configured to predict a latency of a remote response, and use that prediction to select one of the two responses (i.e., local or remote) to sue in responding to user speech.

Furthermore, the aforementioned machine learning model(s) that is configured to select a local vs. remote response and/or predict a timeout period to wait for a remote response may represent a single model or an ensemble of base-level machine learning models, and may be implemented as any type of machine learning model. For example, suitable machine learning models for use with the techniques and systems described herein include, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of models whose outputs (classifications) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

Figure 4:
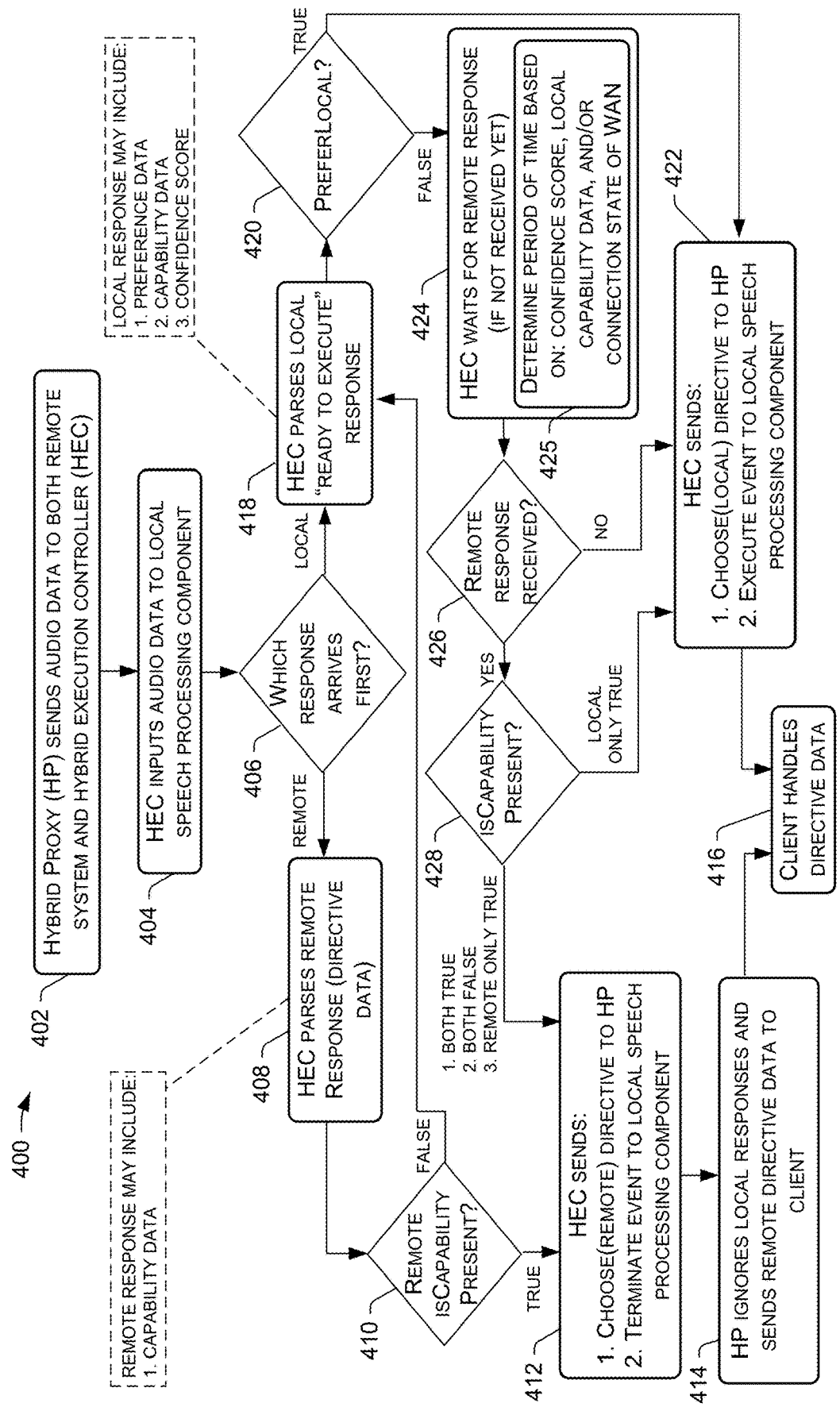
FIG. 4 is a flow diagram of another example process implemented by a hybrid speech interface device for responding to user speech, regardless of whether a remote system is available to the hybrid speech interface device.

FIG. 4 is a flow diagram of another example process 400 implemented by a hybrid speech interface device 102 for responding to user speech, regardless of whether a remote system 104 is available to the hybrid speech interface device 102. For discussion purposes, the process 400 is described with reference to the previous figures.

At 402, a hybrid proxy (HP) 130 of a speech interface device 102 may send audio data 116 to both a remote system 104 (or to a remote speech processing system 120 of the remote system 104) and a hybrid execution controller (HEC) 134 of the speech interface device 102. As shown in the examples of FIGS. 1 and 2, the HP 130 may initially receive audio data 116 that is being sent, by a voice services component 124 of the speech interface device 102, to the remote speech processing system 120. This allows the HP 130 to pass the audio data 116 to the SCL 132, which sends the audio data 116 to the remote speech processing system 120, and to also send the audio data 116 to the HEC 134 of the hybrid request selector 128.

At 404, the HEC 134 may input the audio data 116 to a local speech processing component 140 executing on the speech interface device 102.

At 406, the HEC 134 may then determine which response (i.e., a response from the remote system 104 or a response from the local speech processing component 140) arrives at the HEC 134 first. It is to be appreciated that, in some situations, the HEC 134 may not receive any response from either component (local or remote). For example, if the Internet is down, and if the local speech processing component 140 is somehow inactive (e.g., frozen, crashed and in the process of recovering, etc.), the HEC 134 may not receive a response at all. As mentioned, these instances are expected to be rare, if they occur at all. However, FIG. 4 depicts a scenario where at least one response is received in order to illustrate the operations that may follow block 406 where a response is received.

If the HEC 134 receives (via the HP 130) a response from the remote system 104 prior to receiving a response from the local speech processing component 140, the process 400 may follow the "REMOTE" route from block 406 to block 408, where the HEC 134 may parse the response from the remote system 104 (e.g., by parsing the directive data included in the remote response). As shown in FIG. 4, the response from the remote system 104 may include capability data (e.g., an "isCapabilityPresent" bit or Boolean value) that is used to indicate whether a remote speechlet is available for responding to the user speech.

At 410, the HEC 134 may determine, from parsing the remote response (e.g., the directive data) for capability data (e.g., an "isCapabilityPresent" bit or Boolean value), whether a remote speechlet is available for responding to the user speech based on the capability data in the remote response. For example, an "isCapabilityPresent" that is included in the response from the remote system 104 may be set to a Boolean value of "true" to indicate that an available remote speechlet is capable of handling an event corresponding to the user speech. In this case, the process 400 may follow the "TRUE" route from block 410 to block 412.

At 412, the HEC 134 may (i) instruct the HP 130 to pass/forward remote directives 206 (received from the remote system 104) to the SIM 122 of the voice services component 124, and/or (ii) instruct the local speech processing component 140 to terminate the execution it started (and suspended) based on the audio data 116 it received from the HEC 134 at block 404. As shown, the instruction to the HP 130 may be in the form of a "Choose(remote)" directive (or signal) to the HP 130 instructing the HP 130 to send remotely-generated directive data to the SIM 122 of the voice services component 124. This "Choose(remote" directive (or signal) may also cause the HP 130 to ignore locally-generated directive data (if any is received), or to refrain from sending such locally-generated directive data to the SIM 122. Because the HEC 134 instructs the local speech processing component 140 to terminate its execution, the local speech processing component 140 may refrain from generating directive data, but the HP 130 may nevertheless be configured to filter out local directives 216 as a failsafe mechanism. As mentioned, in some embodiments, remote directives 206 are fully intercepted or otherwise received by the HP 130 and sent to the HEC 134 (e.g., by not allowing the remote directives 206 to pass through the HP 130 directly to the SIM 122, without first being sent to the HEC 134). In these embodiments, the "Choose" signal 214 (an instruction sent from the HEC 134 to the HP 130) may be omitted at block 412. In this scenario, the HEC 134 may ignore local directives 216 (if any local directives 216 are generated) and may send remote directives 206 to the HP 130 at block 412 or block 414, without instructing the HP 130 to choose one or the other type of directive.

At 414, the HP 130 may ignore local responses (or local directives 216) if it received an instruction (e.g., a "Choose" signal 214 from the HEC 134), and may send remote directive data (or remote directives 206) to the voice services component 124 (e.g., to the SIM 122). As noted, the HP 130 may just forward the directives it receives from the HEC 134 at block 414, which may be the case when remote directives 206 are fully intercepted or otherwise received and sent to the HEC 134.

At 416, the voice services component 124 (e.g., the SIM 122) may "handle" directive data it receives from the HP 130, such as by processing the directive data to cause the speech interface device 102 to perform an action(s). In this case, following the "TRUE" route from block 410 to block 412, then to block 414, and then to block 416, the directive data, in this scenario, represents remotely-generated directive data because the response from the remote system 104 indicated (via capability data) that a remote speechlet is available to handle the user speech.

Returning to block 410, if the response from the remote system 104 includes capability data that indicates an unavailability of a remote speechlet for responding to the user speech, such as an "isCapabilityPresent" bit set to a Boolean value of "false," the process 400 may follow the "FALSE" route from block 410 to block 418.

At 418, the HEC 134 eventually receives and parses a response (e.g., a "ReadyToExecute" response 204) from the local speech processing component 140, and this local response indicates that the local speech processing component 140 has started execution based on the audio data 116 and has subsequently suspended the execution until further instruction from the HRS 128. As shown, the response from the local speech processing component 140 may include preference data, capability data, and/or a confidence score, as described herein.

At 420, the HEC 134 may determine, from parsing the local response for preference data (e.g., a "preferLocal" bit or Boolean value), whether there is a preference for responding to the user speech with locally-generated directive data based on the preference data. For example, a "preferLocal" bit included in the response from the local speech processing component 140 may be set to a Boolean value of "true" to indicate that there is a preference for executing the intent by the local speech processing component 140. In this case, the process 400 may follow the "TRUE" route from block 420 to block 422.

At 422, the HEC 134 may (i) instruct the HP 130 to pass/forward local directives 216 (received from the local speech processing component 140 via the HEC 134) to the SIM 122 of the voice services component 124, and/or (ii) instruct the local speech processing component 140 to continue the execution it started (and suspended) based on the audio data 116 it received from the HEC 134 at block 404. As shown, the instruction to the HP 130 may be in the form of a "Choose(local)" directive (or signal) to the HP 130 instructing the HP 130 to send locally-generated directive data to the SIM 122 of the voice services component 124, and to ignore, or refrain from sending, remotely-generated directive data (if any is received) to the SIM 122. Again, in some embodiments, remote directives 206 are fully intercepted or otherwise received by the HP 130 and sent to the HEC 134 (e.g., by not allowing the remote directives 206 to pass through the HP 130 directly to the SIM 122, without first being sent to the HEC 134). In these embodiments, the "Choose" signal 214 (an instruction sent from the HEC 134 to the HP 130) may be omitted at block 422. In this scenario, the HEC 134 may ignore remote directives 206 (if any remote directives 206 are received) and may send local directives 216 to the HP 130 at block 422, without instructing the HP 130 to choose one or the other type of directive.

The process 400 may proceed from block 422 to block 416, where the voice services component 124 (e.g., the SIM 122) "handles" directive data it receives from the HP 130. In this case, following the "TRUE" route from block 420 to block 422, and then to block 416, the directive data, in this scenario, represents locally-generated directive data because the response from the local speech processing component 140 indicated (via preference data) a preference for executing the intent by the local speech processing component 140. Examples where the "preferLocal" bit may be set to a Boolean value of "true" (as determined at block 420) were discussed above and include, without limitation, playing a local media file (from local storage), controlling a home appliance registered exclusively on a local network, vehicle telematics, etc.

Returning to block 420, if the HEC 134 determines, from parsing the local response for preference data (e.g., a "preferLocal" bit or Boolean value), that there is no preference for responding to the user speech with locally-generated directive data based on the preference data (e.g., when a "preferLocal" bit included in the response from the local speech processing component 140 is set to a Boolean value of "false"), the process 400 may follow the "FALSE" route from block 420 to block 424.

At 424, the HEC 134 may wait for a period of time to receive a response from the remote system 104 (if a remote response is not yet received). Accordingly, in the scenario where the process 400 followed the "FALSE" route from block 410 to block 418, then to block 420, and then to block 424, a response from the remote system 104 had already been received at block 406, and, therefore, the process 400 does not involve waiting for a period of time at block 424 by proceeding through block 426 (because the answer to the question at block 426 is "yes"), and by following the "YES" route from block 426 to block 428. Arriving at block 428 means that both responses have been received (i.e., a remote response and a local response), and that there is no preference for using locally-generated directive data over remotely-generated directive data, as determined at block 420 by following the "FALSE" route therefrom.

At 428, the HEC 134 may determine whether (i) capability data in the response from the local speech processing component 140 indicates an availability of a local speechlet for responding to the user speech, and (ii) capability data in the response from the remote system 104 indicates an unavailability of a remote speechlet for responding to the user speech. In other words, if the response from the local speech processing component 140 includes an "isCapabilityPresent" bit is set to a value of "true" while the response from the remote system 104 includes an "isCapabilityPresent" bit is set to a value of "false", this indicates that the local speech processing component 140 is exclusively capable of handling the event, while the remote speech processing system 120 is not capable of doing so. In this scenario, the process 400 may follow the "LOCAL ONLY TRUE" route from block 428 to block 422, and then to block 416, as described above (i.e., the HEC 134 determines to respond to the user speech using directive data from the local speech processing component 140 when the local speech processing component 140 is exclusively capable of handling the event).

If, on the other hand, any other conditions are present at the decision block 428—such as (1) capability data in both responses indicate an availability of a remote speechlet and a local speechlet for responding to the user speech, or (2) capability data in both responses indicate an unavailability of a remote speechlet and an unavailability of a local speechlet for responding to the user speech, or (3) the capability data in the response from the remote system 104 indicates an availability of a remote speechlet, while capability data in the response from the local speech processing component 140 indicates an unavailability of a local speechlet for responding to the user speech—the process 400 may follow the route from block 428 leading to block 412, then to block 414, and then to block 416, as described above (i.e., the HEC 134 determines to respond to the user speech using directive data from the remote system 104 when either (i) the remote speech processing system 120 can handle the event, or (ii) neither the remote speech processing system 120 nor the local speech processing component 140 can handle the event). In the case where neither the remote speech processing system 120 nor the local speech processing component 140 can handle the event, the directive data received from the remote system 104 may include an "apology message" that is output via a speaker(s) of the speech interface device 102 to issue an apology for being unable to fully process the user's request.

Returning to block 406, consider a scenario where the HEC 134 receives a response from the local speech processing component 140 prior to receiving a response from the remote system 104. In this scenario, the process 400 may follow the "LOCAL" route from block 406 to block 418, then to block 420. Assuming preference data in the local response indicates that there is no preference for responding to the user speech with locally-generated directive data, the process 400 may follow the "FALSE" route from block 420, to block 424 where the HEC 134 may wait for a period of time to receive a response from the remote system 104 (assuming, again, that the local response was received first, and that a response from the remote system 104 has not yet been received). The timeout period (i.e., the amount of time the HEC 134 waits for a response from the remote system 104) may vary according to various factors. As shown at sub-block 425, the HEC 134 may determine the period of time to wait for a response from the remote system 104 dynamically based at least in part on one or more of these factors.

One example factor that influences the period of time at block 425 may be a confidence score included in a response from the local speech processing component 140. Accordingly, at block 418, the HEC 134 can parse the response received from the local speech processing component 140 for a confidence score that is associated with an intent determined by the local speech processing component 140 based on the audio data. This confidence score may indicate the local speech processing component's 140 confidence in the accuracy of its recognized intent. Any suitable confidence scale can be used for this purposes (e.g., 0 to 100%, 1 to 10, etc.). At 425, the HEC 134 determine the period of time to wait for a response from the remote system 104 based at least in part on the confidence score. For example, a low confidence score may cause the HEC 134 to adjust the timeout period at block 425 to a longer amount of time, whereas a high confidence score may cause the HEC 134 to adjust the timeout period at block 425 to a shorter amount of time. The maximum timeout allowed at block 424 may be based on a maximum allowed latency from the remote system 104. In other words, an operator of a remote speech processing service may not want a response latency of more than a particular amount of time (e.g., 2 seconds, 4 seconds, etc.). In this case, a high confidence score may cause the HEC 134 to adjust the timeout period at block 425 down to a value that is less than a maximum timeout allowed, whereas a low confidence score may cause the HEC 134 to adjust the timeout period at block 425 up to a value that is not to exceed the maximum timeout allowed.

Another example factor that influences the period of time at block 425 may be value (e.g., a Boolean value) of capability data included in the response from the local speech processing component 140. Accordingly, at block 418, the HEC 134 can parse the response received from the local speech processing component 140 for capability data, and may, at block 425, determine the period of time to wait for a response from the remote system 104 based at least in part on the value of the capability data. For example, if the capability data indicates an unavailability of a local speechlet for responding to the user speech (e.g., an "isCapabilityPresent" bit is set to a value of "false"), the HEC 134 may adjust the timeout period at block 425 to a longer amount of time in hopes of receiving a response from the remote system 104. If, on the other hand, the capability data indicates an availability of a local speechlet for responding to the user speech (e.g., an "isCapabilityPresent" bit set to a value of "true"), the HEC 134 may adjust the timeout period at block 425 to a shorter amount of time based on the notion that the local response is suitable for responding to the user speech.

Another example factor that influences the period of time at block 425 may be a connection state to the remote system 104. For example, the hybrid request selector 128 may be configured to determine whether the remote system 104 is unavailable to the speech interface device 102 (e.g., by diagnosing the status of the wide area network 118, by diagnosing a connection to a wireless access point in the environment, and/or by "pinging" the remote system 104 for a response, etc.). Accordingly, the HEC 134 may determine the period of time to wait for a remote response at block 425 based at least in part on the remote system 104 being unavailable to the speech interface device 102. For instance, if the remote system 104 is determined to be unavailable to the speech interface device 102, the timeout period may be set to zero so that the HEC 134 effectively does not wait at block 424 and proceeds directly to block 426, and then to block 422 following the "NO" route from block 426. In some embodiments, the HEC 134 may compute a confidence score associated with its determination of the connection state to the remote system 104, and may adjust the timeout period at block 425 up or down based on this confidence score. For example, if the HEC 134 is very confident, but perhaps not certain, that the remote system 104 is unavailable (e.g., as indicated by a high confidence score in its connection state determination), the timeout period may be adjusted down at block 425, and vice versa.

At 426, the HEC 134 may determine whether a response from the remote system 104 is received prior to a lapse of the period of time (e.g., the timeout period) that the HEC 134 waits to receive a response from the remote system 104. If a lapse of the period of time occurs without receiving a response from the remote system 104 at block 426, the process 400 may follow the "NO" route from block 426 to block 422, and then to block 416 (i.e., the HEC 134 determines to respond to the user speech using directive data from the local speech processing component 140 when no response is received from the remote system 104 prior to a lapse of the timeout period).

If, on the other hand, a response from the remote system 104 is received prior to a lapse of the period of time, the process 400 may follow the "YES" route from block 426 to block 428 where the HEC 134 may determine, based on capability data included in the respective responses (i.e., local and remote responses), whether to respond to user speech using directive data from the local speech processing component 140 or using directive data from the remote system 104, as described above. In other words, if both responses are received (i.e., remote and local responses), the HEC 134 may determine to use locally-generated directive data if there is a local speechlet available for responding to the user speech and if there is also no remote speechlet available for responding to the user speech. In any other condition (e.g., both components are capable of responding, both components are incapable of responding, or the remote speech processing system 120 is exclusively capable of responding), the HEC 134 may determine to use remotely-generated directive data to respond to the user speech.

Figure 5:
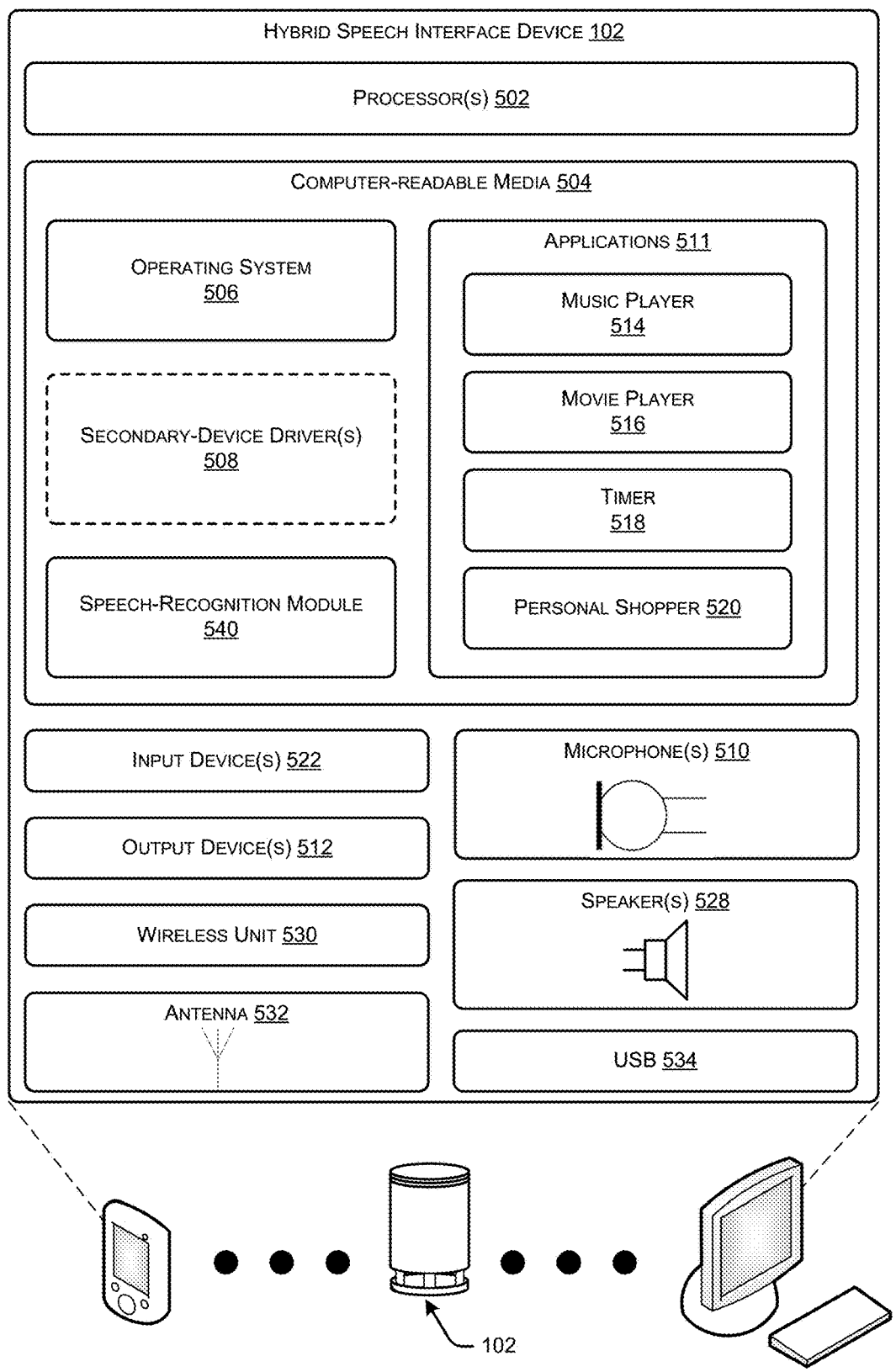
FIG. 5 illustrates example components of an electronic device, such as the hybrid speech interface device of FIG. 1.

FIG. 5 illustrates example components of an electronic device, such as the hybrid speech interface device 102 of FIG. 1. The speech interface device 102 may be implemented as a standalone device that is relatively simple in terms of functional capabilities with limited input/output components, memory, and processing capabilities. For instance, the speech interface device 102 does not have a keyboard, keypad, or other form of mechanical input. Nor does it have a display (other than simple lights, for instance) or touch screen to facilitate visual presentation and user touch input. Instead, the speech interface device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the speech interface device 102 is through voice input and audible output.

The speech interface device 102 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the speech interface device 102 may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the speech interface device 102 includes one or more processors 502 and computer-readable media 504. In some implementations, the processors(s) 502 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 502 may possess its own local memory, which also may store program modules, program data, and/or one or more operating systems.

The computer-readable media 504 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 504 may be implemented as computer-readable storage media ("CRSM"), which may be any available physical media accessible by the processor(s) 502 to execute instructions stored on the memory 504. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 502.

Several modules such as instruction, datastores, and so forth may be stored within the computer-readable media 504 and configured to execute on the processor(s) 502. A few example functional modules are shown as applications stored in the computer-readable media 504 and executed on the processor(s) 502, although the same functionality may alternatively be implemented in hardware, firmware, or as a system on a chip (SOC). At least some of the components shown in FIG. 1 may also be stored in the computer-readable media 504 and executable by the processor(s) 502 to implement the functionality described herein. For example, the voice services component 124, the hybrid request selector 128 and the local speech processing component 140, as well as their subcomponents, may be stored in the computer-readable media 504 and executable by the processor(s) 502 to implement the functionality described herein.

An operating system module 506 may be configured to manage hardware within and coupled to the speech interface device 102 for the benefit of other modules. In addition, in some instances the speech interface device 102 may include some or all of one or more secondary-device drivers 508. In other instances, meanwhile, the speech interface device 102 may be free from the drivers 508 for interacting with second devices. The speech interface device 102 may further including, in some instances, a speech-recognition module 540, which may correspond to the local speech processing component 140 described with reference to FIG. 1.

The speech interface device 102 may also include a plurality of applications 511 stored in the computer-readable media 504 or otherwise accessible to the speech interface device 102. In this implementation, the applications 511 are a music player 514, a movie player 516, a timer 518, and a personal shopper 520. However, the speech interface device 102 may include any number or type of applications and is not limited to the specific examples shown here. The music player 514 may be configured to play songs or other audio files. The movie player 516 may be configured to play movies or other audio visual media. The timer 518 may be configured to provide the functions of a simple timing device and clock. The personal shopper 520 may be configured to assist a user in purchasing items from web-based merchants. When implementing the "hybrid" functionality described herein where a remote system 104 is unavailable to the speech interface device 102, these applications 511 may be configured to access local resources (e.g., local music or movie libraries, a local shopping list, a local calendar, etc.). In some cases, changes made to these local resources may be synched with remote versions of those resources when the remote system 104 subsequently becomes available to the speech interface device 102.

Generally, the speech interface device 102 has input devices 522 and output devices 512. The input devices 522 may include, without limitation, a keyboard, keypad, mouse, touch screen, joystick, control buttons, etc. In some implementations, one or more microphones 510, which may be similar to the microphone(s) 110 of FIG. 1, may function as input devices 522 to receive audio input, such as user voice input. The output device(s) 512 may be similar to the output device(s) 112 of FIG. 1, and may include, without limitation, a display(s), a light element (e.g., LED), a vibrator to create haptic sensations, or the like. In some implementations, one or more speakers 528 may function as output devices 512 to output audio sounds (e.g., audio content, TTS responses, tones at various frequencies, etc.).

A user 106 may interact with the speech interface device 102 by speaking to it, and the one or more microphone(s) 510 captures the user's speech. The speech interface device 102 can communicate back to the user 106 by emitting audible statements through the speaker 528. In this manner, the user 106 can interact with the speech interface device 102 solely through speech, without use of a keyboard or display.

The speech interface device 102 may further include a wireless unit 530 coupled to an antenna 532 to facilitate a wireless connection to a network. The wireless unit 530 may implement one or more of various wireless and/or IoT technologies, such as Bluetooth® protocol, Bluetooth Low Energy (BLE) protocol, ZigBee® protocol, Z-Wave® protocol, WiFi protocol, and/or any other type of protocol usable to communicate wirelessly between electronic devices in an environment, including those that do and/or do not rely data transmission over the wide area network 118. As such, the speech interface device 102 may be configure to act as a hub that can communicate with second devices in the environment and control the second devices, such as by using protocol stacks, drivers, and adapters to communicate over a suitable communications protocol. A USB port 534 may further be provided as part of the speech interface device 102 to facilitate a wired connection to a network, or a plug-in network device that communicates with other wireless networks. In addition to the USB port 534, or as an alternative thereto, other forms of wired connections may be employed, such as a broadband connection, Transmission Control Protocol/Internet Protocol (TCP/IP) protocol connection, etc. The communications interface 114 of FIG. 1 may include some or all of these components, and/or other components to facilitate communication with other devices.

Accordingly, when implemented as the primarily-voice-operated speech interface device 102, there may be no input devices, such as navigation buttons, keypads, joysticks, keyboards, touch screens, and the like other than the microphone(s) 510. Further, there may be no output such as a display for text or graphical output. The speaker(s) 528 may be the main output device. In one implementation, the speech interface device 102 may include non-input control mechanisms, such as basic volume control button(s) for increasing/decreasing volume, as well as power and reset buttons. There may also be a simple light element (e.g., LED) to indicate a state such as, for example, when power is on.

Accordingly, the speech interface device 102 may be implemented as an aesthetically appealing device with smooth and rounded surfaces, with one or more apertures for passage of sound waves. The speech interface device 102 may merely have a power cord and optionally a wired interface (e.g., broadband, USB, etc.). As a result, the speech interface device 102 may be generally produced at a low cost. Once plugged in, the speech interface device 102 may automatically self-configure, or with slight aid of the user, and be ready to use. In other implementations, other I/O components may be added to this basic model, such as specialty buttons, a keypad, display, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A method, comprising:
  receiving, by a speech interface device, audio data that represents user speech;
  sending, by the speech interface device, the audio data to a remote speech processing system executing on a remote system;
  inputting, by a hybrid request selector (HRS) of the speech interface device, the audio data to a local speech processing component of the speech interface device;

performing, by the local speech processing component, speech processing on the audio data to generate intent data indicating an intent associated with the audio data;

receiving, at the HRS and from the local speech processing component, the intent data indicating the intent associated with the audio data;

receiving directive data from the remote system;

based at least in part on receiving the directive data from the remote system:

determining to respond to the user speech with the directive data from the remote system;

causing, by the HRS, the local speech processing component to at least one of suspend or terminate execution of the local speech processing component; and causing the speech interface device to perform an action based at least in part on the directive data from the remote system.

2. The method of claim 1, further comprising:

receiving, from the remote system, data indicating that a remote speechlet is available for responding to the user speech.

3. The method of claim 1, further comprising:

waiting a period of time for the directive data from the remote system.

4. The method of claim 1, further comprising receiving data from the local speech processing component, the data from the local speech processing component including a confidence score indicative of a confidence that the at least one of an application or speechlet stored on the speech interface device is capable of responding to the user speech.

5. The method of claim 1, wherein the causing comprises causing the speech interface device to output content via an output device of the speech interface device.

6. The method of claim 1, wherein the causing comprises causing the speech interface device to send a command to a second device collocated in an environment with the speech interface device, the command instructing an operation to be performed at the second device.

7. The method of claim 1, further comprising:

determining that at least one of an application or speechlet stored on the speech interface is incapable of responding to the user speech.

8. A speech interface device comprising:

one or more processors; and memory storing computer-executable instructions that, when executed by the one or more processors, cause the speech interface device to:

receive audio data that represents user speech;

send the audio data to a remote speech processing system executing on a remote system;

input, by a hybrid request selector (HRS) of the speech interface device, the audio data to a local speech processing component of the speech interface device;

perform, by the local speech processing component, speech processing on the audio data to generate intent data indicating an intent associated with the audio data;

receive, at the HRS and from the local speech processing component, the intent data indicating the intent associated with the audio data;

receive directive data from the remote speech processing system;

based at least in part on receiving the directive data from the remote speech processing system:

determine to respond to the user speech with the directive data from the remote speech processing system;

cause, by the HRS, the local speech processing component to at least one of suspend or terminate execution of the local speech processing component; and perform an action based at least in part on the directive data.

9. The speech interface device of claim 8, wherein:

the directive data received from the remote system indicates that a remote speechlet is available for responding to the user speech.

10. The speech interface device of claim 8, wherein the computer-executable instructions, when executed by the one or more processors, further cause the speech interface device to receive data from the local speech processing component indicating that a local speechlet is unavailable for responding to the user speech.

11. The speech interface device of claim 8, wherein the computer-executable instructions, when executed by the one or more processors, further cause the speech interface device to, after determining to respond to the user speech with the directive data received from the remote system, refrain from sending second directive data received from the local speech processing component to a voice services component of the speech interface device.

12. The speech interface device of claim 8, wherein the action performed by the speech interface device comprises outputting content via an output device of the speech interface device.

13. The speech interface device of claim 8, wherein the action performed by the speech interface device comprises sending a command to a second device collocated in an environment with the speech interface device, the command instructing an operation to be performed at the second device.

14. A device comprising:

one or more processors; and memory storing computer-executable instructions that, when executed by the one or more processors, cause the speech interface device to:

receive audio data that represents user speech;

send the audio data to a remote speech processing system executing on a remote system;

input the audio data to a local speech processing component of the speech interface device;

perform, by the local speech processing component, speech processing on the audio data to generate intent data indicating an intent associated with the audio data;

receive, from the local speech processing component, the intent data indicating the intent associated with the audio data;

receive directive data from the remote speech processing system;

based at least in part on receiving the directive data from the remote speech processing system:

determine to respond to the user speech with the directive data from the remote speech processing system;

cause the local speech processing component to at least one of suspend or terminate execution of the local speech processing component; and perform an action based at least in part on the directive data.

15. The device of claim 14, wherein the directive data received from the remote system indicates that a remote speechlet is available for responding to the user speech.

16. The device of claim 14, wherein the computer-executable instructions, when executed by the one or more processors, further cause the speech interface device to receive data from the local speech processing component indicating that a local speechlet is unavailable for responding to the user speech.

17. The device of claim 14, wherein the computer-executable instructions, when executed by the one or more processors, further cause the speech interface device to, after determining to respond to the user speech with the directive data received from the remote system, refrain from sending second directive data received from the local speech processing component to a voice services component of the speech interface device.

18. The device of claim 14, wherein the action performed by the speech interface device comprises outputting content via an output device of the speech interface device.

19. The device of claim 14, wherein the action performed by the speech interface device comprises sending a command to a second device collocated in an environment with the speech interface device, the command instructing an operation to be performed at the second device.

* * * * *